(12) United States Patent
Kim et al.

(10) Patent No.: US 8,173,040 B2
(45) Date of Patent: May 8, 2012

(54) COMPOSITION INCLUDING BENZOXAZINE-BASED COMPOUND FOR FORMING BOARD AND BOARD FABRICATED USING THE SAME

(75) Inventors: Kwang-Hee Kim, Seoul (KR);
Seong-Woo Choi, Yongin-si (KR);
Myung-Sup Jung, Seongnam-si (KR);
Chung-Kun Cho, Suwon-si (KR);
Jae-Jun Lee, Suwon-si (KR); Kalinina Fedosya, Ulan-Ude (RU)

(73) Assignee: Samsung Electronics Co., Ltd. (KR)

( * ) Notice: Subject to any disclaimer, the term of this patent is extended or adjusted under 35 U.S.C. 154(b) by 103 days.

(21) Appl. No.: 12/685,314

(22) Filed: Jan. 11, 2010

(65) Prior Publication Data
US 2010/0285243 A1 Nov. 11, 2010

(30) Foreign Application Priority Data

May 8, 2009 (KR) ........................ 10-2009-0040443

(51) Int. Cl.
*C09K 19/38* (2006.01)
*C09K 19/52* (2006.01)
*C09K 19/54* (2006.01)
*H05K 1/03* (2006.01)

(52) U.S. Cl. ................ 252/299.01; 252/299.5; 428/901; 174/256

(58) Field of Classification Search ............. 252/299.01, 252/299.66, 299.67, 299.5; 544/72, 73, 74, 544/88, 90, 96; 174/256; 428/901
See application file for complete search history.

(56) References Cited

U.S. PATENT DOCUMENTS

| | | | | |
|---|---|---|---|---|
| 7,947,802 | B2 * | 5/2011 | Ishida et al. .................. | 528/423 |
| 2007/0141426 | A1 * | 6/2007 | Choi et al. ....................... | 429/33 |
| 2007/0275285 | A1 * | 11/2007 | Choi et al. ....................... | 429/30 |
| 2009/0069533 | A1 * | 3/2009 | Ishida et al. .................. | 528/360 |

FOREIGN PATENT DOCUMENTS

| | | |
|---|---|---|
| JP | 2008-037982 | 2/2008 |
| JP | 2008-050557 | 3/2008 |
| JP | 2008-239649 | 10/2008 |
| KR | 1020030036816 A | 5/2003 |
| KR | 1020070057205 A | 6/2007 |
| KR | 1020080103312 A | 11/2008 |

OTHER PUBLICATIONS

English translation by computer for JP 2008-050557, http://www4.ipdl.inpit.go.jp/Tokujitu/PAJdetail.ipdl?N0000=60&N0120=01&N2001=2&N3001=2008-050557.*

* cited by examiner

*Primary Examiner* — Shean Wu

(74) *Attorney, Agent, or Firm* — Cantor Colburn LLP

(57) ABSTRACT

Disclosed is a composition for forming a board including a benzoxazine-based compound and a liquid crystal polymer or oligomer, and a board fabricated using the same. A board comprising the composition including the benzoxazine-based compound and the liquid crystal compound, and a prepreg comprising the cured composition, are also disclosed.

18 Claims, 5 Drawing Sheets

COMPOSITION INCLUDING BENZOXAZINE-BASED COMPOUND FOR FORMING BOARD AND BOARD FABRICATED USING THE SAME

CROSS-REFERENCE TO RELATED APPLICATION

This application claims priority to Korean Patent Application No. 10-2009-0040443 filed on May 8, 2009, and all the benefits accruing therefrom under 35 U.S.C. 119, the contents of which in their entirety are herein incorporated by reference.

BACKGROUND

1. Field

A composition for forming a board including a benzoxazine-based compound and a board fabricated using the same are provided.

2. Description of the Related Art

Electronic devices such as computers, semiconductor devices, displays, and communication devices include printed electronic circuit boards, also referred to herein simply as "boards". A printed electronic circuit board may include signal lines for transferring signals, insulating layers for preventing short circuits between signal lines, switching elements, and other elements.

To increase performance of electronic devices, a constituent printed electronic circuit may be formed as a thin film having a very small size. Accordingly, a board that electronic circuits are printed in may need various performance factors compatible with the needs of the electronic devices and their performance requirements such as heat resistance or low dielectric constant.

SUMMARY

In an embodiment, disclosed is a composition for forming a board having improved heat resistance and being applicable to a board of low dielectric constant.

In another embodiment, disclose is a composition for forming a board having high curability and improved solubility.

In still another embodiment, disclosed is a composition for forming a board including a benzoxazine-based compound and a liquid crystal polymer or oligomer is provided.

In an embodiment, the benzoxazine-based compound may include a compound represented by the following Chemical Formula 1:

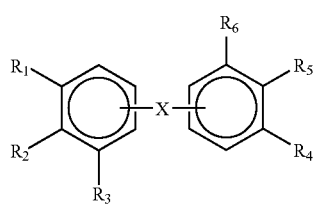

Chemical Formula 1 where, in the above Chemical Formula 1,
X is a single bond, a C1 to C20 alkylene, a C6 to C20 arylene, a C5 to C20 heteroarylene, or a combination comprising at least one of the foregoing, or where X forms a fused ring with adjacent benzene ring when X is an arylene or a heteroarylene, $R_1$ and $R_2$, or $R_2$ and $R_3$ is connected to each other to form a functional group represented by the following Chemical Formula 2, and $R_4$ and $R_5$, or $R_5$ and $R_6$ is connected to each other to form a functional group represented by the following Chemical Formula 2.

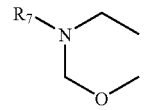

Chemical Formula 2

In the above Chemical Formula 2,
$R_7$ is a substituted or unsubstituted C1 to C20 alkyl, a substituted or unsubstituted C1 to C20 alkoxy, a substituted or unsubstituted C2 to C20 alkenyl, a substituted or unsubstituted C2 to C20 alkynyl, a substituted or unsubstituted C6 to C20 aryl, a substituted or unsubstituted C6 to C20 aryloxy, a substituted or unsubstituted C7 to C20 arylalkyl, a substituted or unsubstituted C2 to C20 heteroaryl, a substituted or unsubstituted C2 to C20 heteroaryloxy, a substituted or unsubstituted C2 to C20 heteroarylalkyl, a substituted or unsubstituted C3 to C20 cycloalkyl, a substituted or unsubstituted C2 to C20 heterocycle, or a combination comprising at least one of the foregoing.

In another embodiment, the benzoxazine-based compound may include compounds represented by the following Chemical Formula 3:

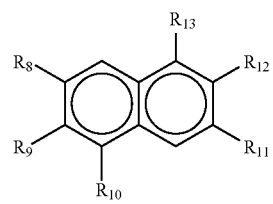

Chemical Formula 3 where, in the above Chemical Formula 3,
$R_8$ and $R_9$, or $R_9$ and $R_{10}$ is connected to each other to form a functional group represented by the following Chemical Formula 4, and $R_{11}$ and $R_{12}$, or $R_{12}$ and $R_{13}$ is connected to each other to form a functional group represented by the following Chemical Formula 4.

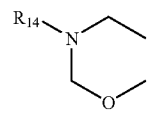

Chemical Formula 4

In the above Chemical Formula 4,
$R_{14}$ is a substituted or unsubstituted C1 to C20 alkyl, a substituted or unsubstituted C1 to C20 alkoxy, a substituted or unsubstituted C2 to C20 alkenyl, a substituted or unsubstituted C2 to C20 alkynyl, a substituted or unsubstituted C6 to C20 aryl, a substituted or unsubstituted C6 to C20 aryloxy, a substituted or unsubstituted C7 to C20 arylalkyl, a substituted or unsubstituted C2 to C20 heteroaryl, a substituted or unsubstituted C2 to C20 heteroaryloxy, a substituted or unsubstituted C2 to C20 heteroarylalkyl, a substituted or unsubstituted C3 to C20 cycloalkyl, a substituted or unsubstituted C2 to C20 heterocycle, or a combination comprising at least one of the foregoing.

The compound represented by the above Chemical Formula 3 may include one selected from the compounds represented by the following Chemical Formulae 6 to 8, and combinations comprising at least one of the foregoing:

Chemical Formula 6

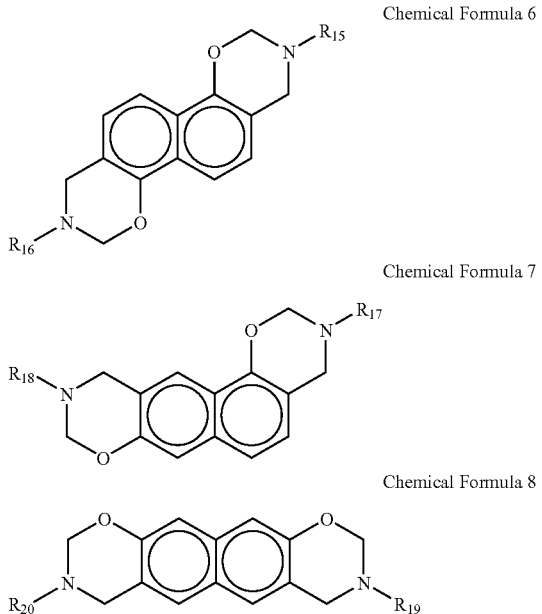

Chemical Formula 7

Chemical Formula 8 where, in the above Chemical Formulae 6 to 8, $R_{15}$ to $R_{20}$ are a substituted or unsubstituted C1 to C20 alkyl, a substituted or unsubstituted C1 to C20 alkoxy, a substituted or unsubstituted C2 to C20 alkenyl, a substituted or unsubstituted C2 to C20 alkynyl, a substituted or unsubstituted C6 to C20 aryl, a substituted or unsubstituted C6 to C20 aryloxy, a substituted or unsubstituted C7 to C20 arylalkyl, a substituted or unsubstituted C2 to C20 heteroaryl, a substituted or unsubstituted C2 to C20 heteroaryloxy, a substituted or unsubstituted C2 to C20 heteroarylalkyl, a substituted or unsubstituted C3 to C20 cycloalkyl, a substituted or unsubstituted C2 to C20 heterocycle, or a combination comprising at least one of the foregoing.

The liquid crystal polymer or oligomer may include at least one of C(=O)O, O, C(=O)NR', NR', CO, or a combination comprising at least one of the foregoing where R' is hydrogen or a C1 to C5 alkyl, and a substituted or unsubstituted C6 to C30 aromatic cyclic group, in its main chain.

The liquid crystal oligomer may be represented by the following Chemical Formula 9-1.

Chemical Formula 9-1

In the above Chemical Formula 9-1, $A_1$ is represented by the following Chemical Formula 9-2, $A_2$ is represented by the following Chemical Formula 9-3, $B_1$ and $B_2$ are independently thermally curable cross-linking reactive group including a terminal multiple bond, and $k_1$ and $k_2$ are independently integers of from 1 to 50.

$$-Y_3-Ar_1-Y_4-$$ Chemical Formula 9-2

In the above Chemical Formula 9-2, $Y_3$ and $Y_4$ are independently C(=O)O, O, C(=O)NR, NR, CO, or a combination comprising at least one of the foregoing where R is hydrogen, a C1 to C20 alkyl, or a C6 to C30 aryl; and $Ar_1$ includes at least one selected from the following Chemical Formulae 10-1 to 10-5.

$$-Y_5-Ar_2-Y_6-$$ Chemical Formula 9-3

In the above Chemical Formula 9-3, $Y_5$ and $Y_6$ are independently C(=O)O, O, C(=O)NR, NR CO, or a combination comprising at least one of the foregoing where R is hydrogen, a C1 to C20 alkyl, or a C6 to C30 aryl; and $Ar_e$ includes at least one selected from the following Chemical Formulae 11-1 to 11-5.

Chemical Formula 10-1

Chemical Formula 10-2

Chemical Formula 10-3

Chemical Formula 10-4

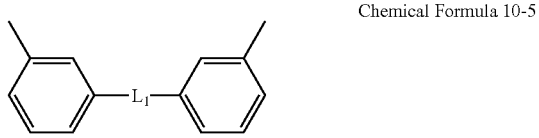

Chemical Formula 10-5

In the above Chemical Formula 10-5, $L_1$ is a divalent organic functional group.

Chemical Formula 11-1

Chemical Formula 11-2

Chemical Formula 11-3

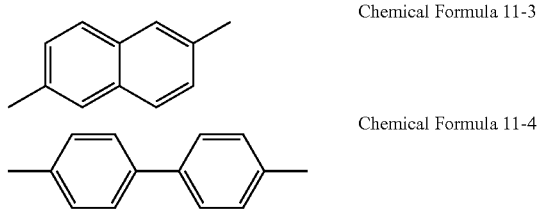

Chemical Formula 11-4

Chemical Formula 11-5

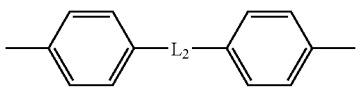

In the above Chemical Formula 11-5, $L_2$ is a divalent organic functional group. The liquid crystal polymer or oligomer may include a hydroxyl group, a maleimide group, a nadimide group, a phthalimide group, an acetylene group, a propargyl ether group, a benzocyclobutene group, a cyanate group, a substituted or unsubstituted C3 to C30 alicyclic group including a double bond or a triple bond, a C8 to C30 alkenyl including a C6 to C20 aryl substituent, or a C8 to C30 alkynyl including a C6 to C20 aryl substituent, or a combination comprising at least one of the foregoing at its terminus.

The composition according to the aspect may further include a maleimide-based compound including at least two maleimide groups, and may further include an epoxy-based compound.

In another embodiment, a prepreg is fabricated using the composition for forming a board.

In a further embodiment, a board including a prepreg fabricated using the composition for forming a board is provided.

Hereinafter, further aspects will be described in detail.

DETAILED DESCRIPTION

Figure 1:
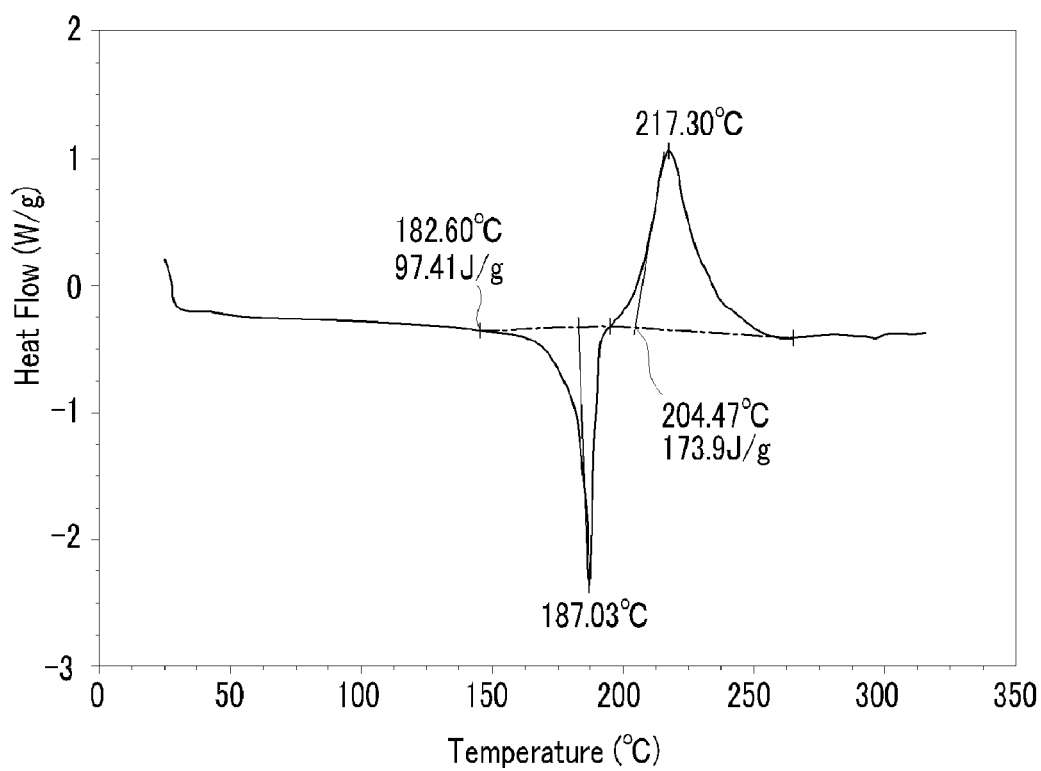
FIG. 1 is a graph showing DSC (Differential Scanning Calorimeter) analysis of an exemplary benzoxazine-based compound according to Example 1.

Exemplary embodiments will hereinafter be described in detail. However, these embodiments are only exemplary and are not limited thereto. In this regard, the present embodiments may have different forms and should not be construed as being limited to the descriptions set forth herein. Accordingly, the embodiments are merely described below, by referring to the figures, to explain aspects of the present description.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, components, and/or groups thereof. All ranges and endpoints reciting the same feature are independently combinable.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, when a specific definition is not provided, the terms "an alkenyl", "an alkynyl", and "an aryl" respectively refer to a C2 to C20 alkenyl such as for example ethenyl, propenyl, 1- or 2-butenyl, isobutenyl, 1-, 2-, or 3-pentyl, and the like, a C2 to C20 alkynyl such as for example ethynyl, n-propyl, isopropyl, n-butyl, isobutyl, t-butyl, n-pentyl, and the like, and a C6 to C30 aryl. Unless otherwise specified, any unassigned bonds in the chemical formulas herein represent points of attachment to other unassigned bonds, and do not represent terminal methyl groups.

As used herein, when specific definition is not provided, the term "substituted" refers to one substituted with at least a substituent selected from the group consisting of halogen, a C1 to C20 haloalkyl, a C1 to C20 alkyl, a C1 to C20 alkoxy, a C6 to C30 aryl, a C6 to C30 aryloxy, or a combination comprising at least one of the foregoing.

As used herein, when specific definition is not provided, the term "heteroaryl" refers to a C1 to C20 monovalent monocyclic or bicyclic aromatic divalent organic group including one, two, or three heteroatoms selected from N, O, P, S, or a combination comprising at least one of the foregoing, and the balance carbon. For example, non-limiting examples of the heteroaryl includes pyrazinyl, furanyl, thienyl, pyridyl, pyrimidinyl, isothiazolyl, oxazolyl, thiazolyl, pyrrolyl, triazolyl, and 1,2,4-thiadiazolyl.

As used herein, when specific definition is not provided, the term "heterocycle" refers to a C2 to C20 heterocycloalkyl, a C2 to C20 heterocycloalkenyl, or a C2 to C20 heterocycloalkynyl including heteroatoms such as N, O, P, S, or a combination comprising at least one of the foregoing and the like and the balance carbon.

Also as used herein, "prepreg" is a sheet comprising uncured or partially cured composition for forming a board, which does not have a metal layer laminated to it. Also as used herein, a board includes a prepreg having one or more layers of a metal cladding, laminated to a surface of the prepreg.

The composition for forming a board according to one embodiment includes a benzoxazine-based compound and a liquid crystal polymer or oligomer. Exemplary components included in the composition for forming a board will hereinafter be described in detail.

Benzoxazine-Based Compound

The benzoxazine-based compound includes a compound represented by the following Chemical Formula 1.

Chemical Formula 1

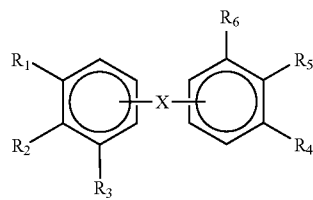

In the above Chemical Formula 1,

X is a single bond, a C1 to C20 alkylene, a C6 to C20 arylene, a C5 to C20 heteroarylene, or a combination comprising at least one of the foregoing, or where X forms a fused ring with adjacent benzene ring when X is an arylene or a heteroarylene, $R_1$ and $R_2$, or $R_2$ and $R_3$ are connected to each other to form a functional group represented by the following Chemical Formula 2, and $R_4$ and $R_5$, or $R_5$ and $R_6$ are connected to each other to form a functional group represented by the following Chemical Formula 2.

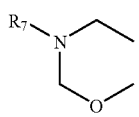

Chemical Formula 2

In the above Chemical Formula 2, $R_7$ is a substituted or unsubstituted C1 to C20 alkyl, a substituted or unsubstituted C1 to C20 alkoxy, a substituted or unsubstituted C2 to C20 alkenyl, a substituted or unsubstituted C2 to C20 alkynyl, a substituted or unsubstituted C6 to C20 aryl, a substituted or unsubstituted C6 to C20 aryloxy, a substituted or unsubstituted C7 to C20 arylalkyl, a substituted or unsubstituted C2 to C20 heteroaryl, a substituted or unsubstituted C2 to C20 heteroaryloxy, a substituted or unsubstituted C2 to C20 heteroarylalkyl, a substituted or unsubstituted C3 to C20 cycloalkyl, a substituted or unsubstituted C2 to C20 heterocycle, or a combination comprising at least one of the foregoing.

For example, X of the above Chemical Formula 1 may be a phenylene group having six carbon atoms, and X may be linked with benzene rings on both sides through a single bond. Also, X, which is a C6 phenylene group, may be linked with benzene rings on both sides to thereby form a fused ring such as anthracene.

In the above Chemical Formula 2, $R_7$ may be one of groups represented by the following Chemical Formulae 5-1 to 5-12, and combinations comprising at least one of the foregoing.

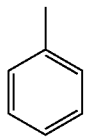

Chemical Formula 5-1

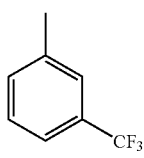

Chemical Formula 5-2

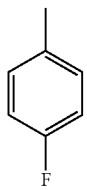

Chemical Formula 5-3

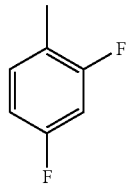

Chemical Formula 5-4

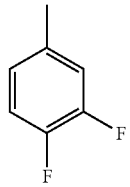

Chemical Formula 5-5

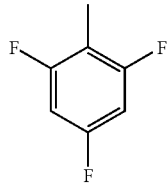

Chemical Formula 5-6

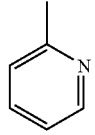

Chemical Formula 5-7

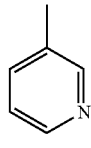

Chemical Formula 5-8

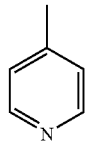

Chemical Formula 5-9

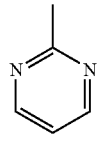

Chemical Formula 5-10

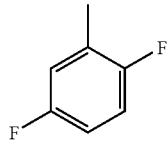

Chemical Formula 5-11

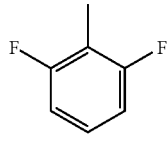

Chemical Formula 5-12

The benzoxazine-based compound may include compounds represented by the following Chemical Formula 3.

Chemical Formula 3

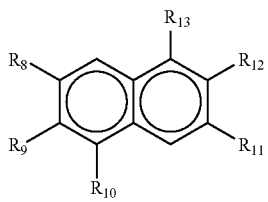

In the above Chemical Formula 3, at least one of $R_8$ and $R_9$, or at least one of $R_9$ and $R_{10}$ is connected to each other to form a functional group represented by the following Chemical Formula 4, and at least one of $R_{11}$ and $R_{12}$, or at least one of $R_{12}$ and $R_{13}$ is connected to each other to form a functional group represented by the following Chemical Formula 4.

Chemical Formula 4

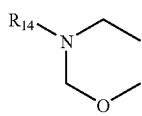

In the above Chemical Formula 4, $R_{14}$ is a substituted or unsubstituted C1 to C20 alkyl, a substituted or unsubstituted C1 to C20 alkoxy, a substituted or unsubstituted C2 to C20 alkenyl, a substituted or unsubstituted C2 to C20 alkynyl, a substituted or unsubstituted C6 to C20 aryl, a substituted or unsubstituted C6 to C20 aryloxy, a substituted or unsubstituted C7 to C20 arylalkyl, a substituted or unsubstituted C2 to C20 heteroaryl, a substituted or unsubstituted C2 to C20 heteroaryloxy, a substituted or unsubstituted C2 to C20 heteroarylalkyl, a substituted or unsubstituted C3 to C20 cycloalkyl, a substituted or unsubstituted C2 to C20 heterocycle, or a combination comprising at least one of the foregoing.

The compound represented by the above Chemical Formula 3 includes one selected from the compounds represented by the following Chemical Formulae 6 to 8, and combinations comprising at least one of the foregoing.

Chemical Formula 6

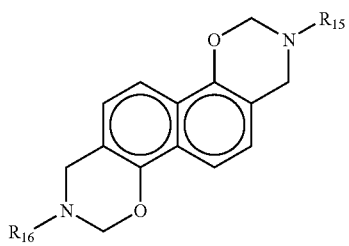

Chemical Formula 7

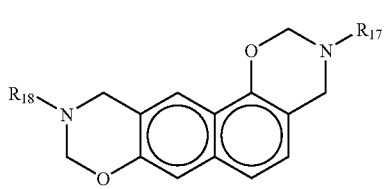

Chemical Formula 8

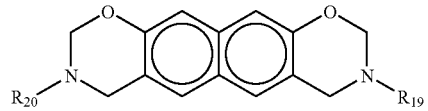

In the above Chemical Formulae 6 to 8, $R_{15}$ to $R_{20}$ are a substituted or unsubstituted C1 to C20 alkyl, a substituted or unsubstituted C1 to C20 alkoxy, a substituted or unsubstituted C2 to C20 alkenyl, a substituted or unsubstituted C2 to C20 alkynyl, a substituted or unsubstituted C6 to C20 aryl, a substituted or unsubstituted C6 to C20 aryloxy, a substituted or unsubstituted C7 to C20 arylalkyl, a substituted or unsubstituted C2 to C20 heteroaryl, a substituted or unsubstituted C2 to C20 heteroaryloxy, a substituted or unsubstituted C2 to C20 heteroarylalkyl, a substituted or unsubstituted C3 to C20 cycloalkyl, a substituted or unsubstituted C2 to C20 heterocycle, or a combination comprising at least one of the foregoing.

In the above Chemical Formulae 6 to 8, $R_{15}$ to $R_{20}$ may be one of the groups represented by the above Chemical Formulae 5-1 to 5-12, and combinations comprising at least one of the foregoing.

When the benzoxazine-based compound is heated, it becomes cured to form a network structure. For example, the thermal curing reaction of a benzoxazine-based compound of Formula 1-1 to the thermally cured product of Chemical Formula 1-2 may be performed as depicted in Reaction Scheme 1.

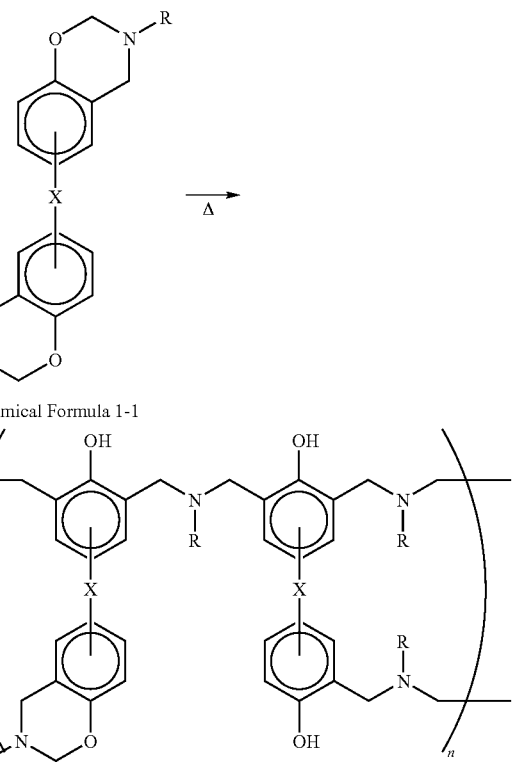

In the Reaction Scheme 1, n is a positive integer representing the degree of polymerization from the thermal curing, X is the same as X in the above Chemical Formula 1, and R is the same as $R_7$ in the above Chemical Formula 2.

The benzoxazine-based compound is thoroughly dissolved in a polar solvent, and readily thermally curable at a temperature of about 240 to 300° C. without need for a catalyst, and further, no or minimal byproduct is produced from the thermal curing. Accordingly, when a benzoxazine-based compound is used in a composition for a board, the surface uniformity of the board may be improved. Also, the thermal curability of the benzoxazine-based compound is high, such that when a benzoxazine-based compound is used in a composition for a board, the moisture absorbance rate and dielectric constant of the board may be reduced, thus improving the heat resistance of the board.

Examples of the compounds represented by the above Chemical Formulae 6 to 8 include the compounds represented by the following Chemical Formulae 15-1 to 15-6.

Chemical Formula 15-1

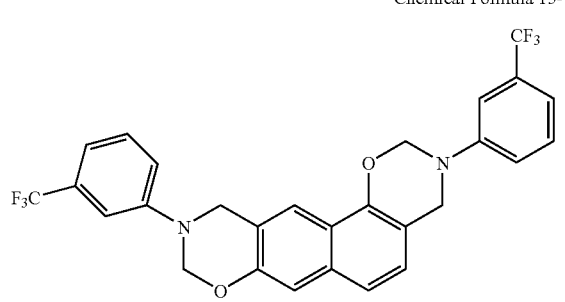

Chemical Formula 15-2

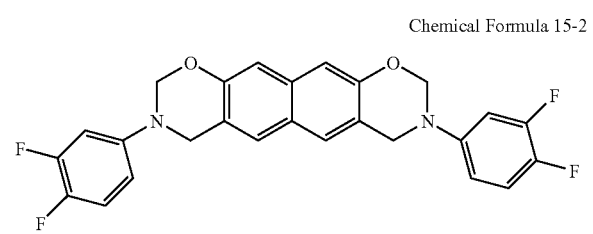

Chemical Formula 15-3

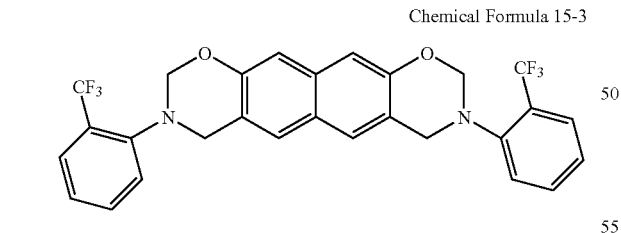

Chemical Formula 15-4

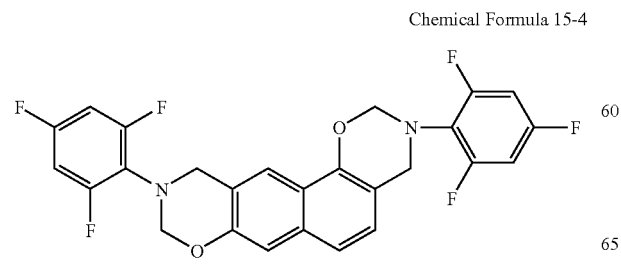

Chemical Formula 15-5

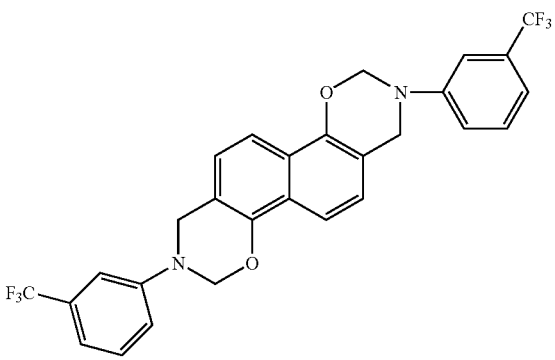

Chemical Formula 15-6

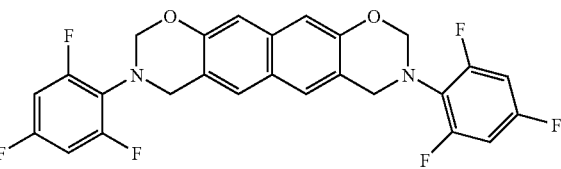

For example, the benzoxazine-based compound may be synthesized by condensation of formaldehyde (or a formaldehyde equivalent) and an amine compound (e.g., a primary amine $H_2N$—R) with 1,5-, 1,6-, and 1,7-dihydroxynaphthalenes respectively, according to the following exemplary Reaction Schemes 2 to 4.

Reaction Scheme 2

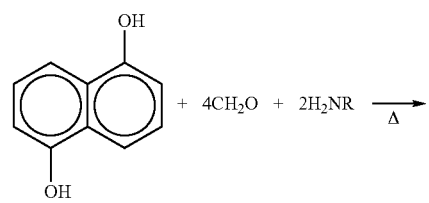

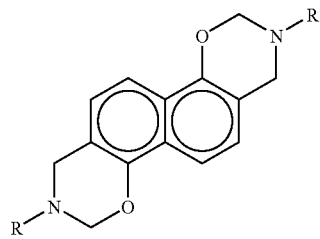

Reaction Scheme 3

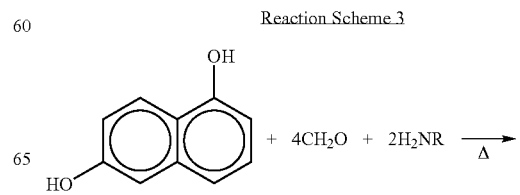

-continued

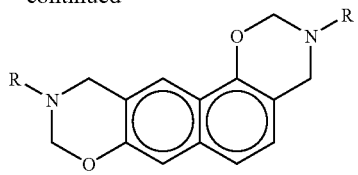

Reaction Scheme 4

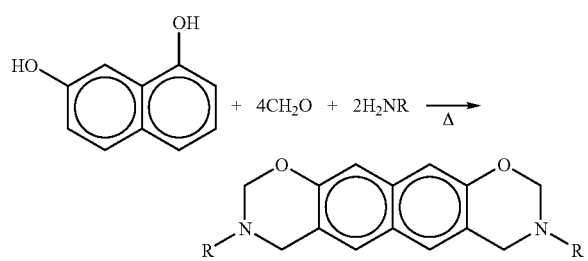

In the Reaction Schemes 2 to 4, R is the same as $R_{14}$ in the above Chemical Formula 4.

First, dihydroxynaphthalene, formaldehyde and amine compound are mixed. The resulting mixture may be heated without a solvent or may be heated to reflux in the presence of added solvent. The product may then be isolated in purified form after a work-up process.

Where a solvent is used in the reaction, exemplary solvents may include 1,4-dioxane, chloroform, dichloromethane, or tetrahydrofuran (THF). The heating temperature for the reaction may be adjusted from about 80 to about 110° C.

An exemplary work-up process includes, rinsing the resulting material from the reaction with alkaline aqueous solution, such as aqueous sodium hydroxide. In an embodiment, the alkaline aqueous solution has a concentration of about 0.001 to about 5 M. Subsequently, the organic solution of the resulting rinsed material may be dried using a drying agent such as magnesium sulfate. Subsequently, the drying agent is removed through filtration, and the solvent removed by reduced-pressure evaporation and optionally further dried by a drying process such as in a drying oven, optionally under vacuum, and a resulting benzoxazine-based compound may in this way be obtained.

The weight ratio of a liquid crystal polymer or oligomer and the benzoxazine-based compound used for the composition for forming a board may be from about 1:9 to about 9:1, specifically about 2:8 to about 8:2. In addition, when they are used in these amounts, mechanical characteristics, physiochemical characteristics, and the like of a composition for forming a board may be further improved. Furthermore, when the benzoxazine-based compound is added at in relatively greater amount, the thermal expansion coefficient may decrease.

Liquid Crystal Polymer or Oligomer

A liquid crystal polymer or liquid crystal oligomer may be used. The liquid crystal polymer or oligomer includes an aromatic cyclic group in its main chain. in an embodiment, the liquid crystal oligomer may have a number average molecular weight (Mn) of from about 500 to about 10,000. in another embodiment, the liquid crystal polymer may have a number average molecular weight about 10,000 to about 1,000,000.

The liquid crystal polymer or oligomer may include at least one of C(=O)O, O, C(=O)NR', NR', CO, or a combination comprising at least one of the foregoing where R' is hydrogen or a C1 to C5 alkyl, and a substituted or unsubstituted aromatic cyclic group in its main chain. The aromatic cyclic group has a cyclic structure in which unsaturated bonds, electron lone pairs (as from the use of heteroatoms), and the like are mixed, with reference to a functional group in which the electrons are delocalized or resonated. For example, the aromatic cyclic group includes a C5 to C20 cycloalkenyl, a C4 to C20 heterocycloalkenyl, a C6 to C30 aryl, a C2 to C30 heteroaryl, a C2 to C30 heteroaryloxy, a combination comprising at least one of the foregoing, and the like. The prefix "hetero" refers to one in which at least one of CH present in a ring substituted with a heteroatom such as N, O, S, P, or a combination comprising at least one of the foregoing. The liquid crystal polymer or oligomer includes, in an embodiment, at least two aromatic cyclic groups that are different from each other (i.e., are not identical) in the main chain.

In one embodiment, the aromatic cyclic group is at least one selected from the group consisting of the following Chemical Formulae 10-1 to 10-5. In another embodiment, the aromatic cyclic group may be at least one selected from the group consisting of the following Chemical Formulae 10-1 to 10-5 and at least one selected from the group consisting of the following Chemical Formulae 11-1 to 11-5. In another embodiment, in the following Chemical Formulae 10-1 to 10-5 and the following Chemical Formulae 11-1 to 11-5, at least one of the halogen or C1 to C5 alkyl group of the benzene ring may be substituted.

The functional group represented by the following Chemical Formulae 10-1 to 10-5 may be included in the liquid crystal polymer or oligomer in an amount of about 5 mol % to about 60 mol %, specifically about 10 mol % to about 50 mol %, based on the total liquid crystal polymer or oligomer. When it is within this range, the solubility to the solvent further improves and the viscosity is within a desired range.

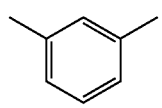

Chemical Formula 10-1

Chemical Formula 10-2

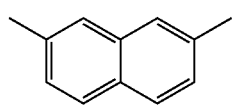

Chemical Formula 10-3

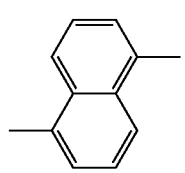

Chemical Formula 10-4

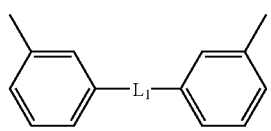

Chemical Formula 10-5

In the above Chemical Formula 10-5, $L_1$ is a divalent organic functional group.

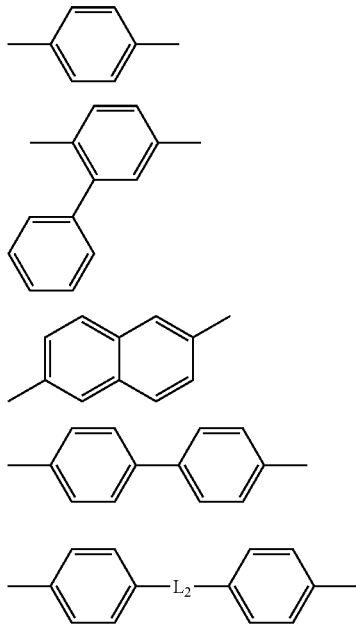

Chemical Formula 11-1

Chemical Formula 11-2

Chemical Formula 11-3

Chemical Formula 11-4

Chemical Formula 11-5

In the above Chemical Formula 11-5, $L_2$ is a divalent organic functional group.

For example, $L_1$ and $L_2$ may be represented by one of the following Chemical Formulae 13-1 to 13-11. Furthermore, the benzene ring may be substituted with at least one of a halogen, a C1 to C5 alkyl group, a combination comprising at least one of the foregoing, and on the like, in the following Chemical Formulae 13-1 to 13-11.

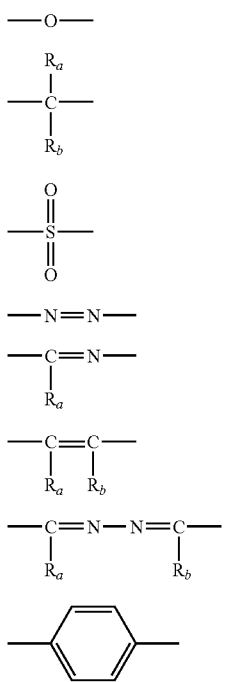

Chemical Formula 13-1

Chemical Formula 13-2

Chemical Formula 13-3

Chemical Formula 13-4

Chemical Formula 13-5

Chemical Formula 13-6

Chemical Formula 13-7

Chemical Formula 13-8

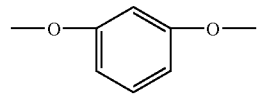

Chemical Formula 13-9

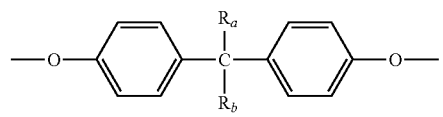

Chemical Formula 13-10

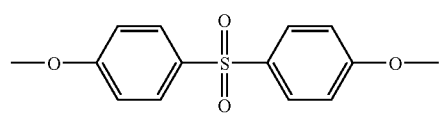

Chemical Formula 13-11

In the above Chemical Formulae 13-1 to 13-11, $R_a$ and $R_b$ are independently hydrogen, a halogen, a C1 to C5 alkyl, a C1 to C5 haloalkyl, or a combination comprising at least one of the foregoing.

The liquid crystal oligomer may be represented by the following Chemical Formula 9-1.

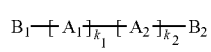

Chemical Formula 9-1

In the above Chemical Formula 9-1, $A_1$ is represented by the following Chemical Formula 9-2, while $A_2$ is represented by the following Chemical Formula 9-3, and $B_1$ and $B_2$ are independently thermally curable cross-linking reactive groups including a multiple bond at the terminus, and $k_1$ and $k_2$ are independently integers of from 1 to 50.

      Chemical Formula 9-2

In the above Chemical Formula 9-2, $Y_3$ and $Y_4$ are independently $C(=O)O$, $O$, $C(=O)NR$, $NR$, $CO$, or a combination comprising at least one of the foregoing where R is hydrogen, a C1 to C20 alkyl, or a C6 to C30 aryl, and $Ar_1$ is one selected from consisting of the above Chemical Formulae 10-1 to 10-5 and combinations comprising at least one of the foregoing.

      Chemical Formula 9-3

In the above Chemical Formula 9-3, $Y_5$ and $Y_6$ are independently $C(=O)O$, $O$, $C(=O)NR$, $NR$, $CO$, or a combination comprising at least one of the foregoing where R is hydrogen, a C1 to C20 alkyl, or a C6 to C30 aryl, and $Ar_2$ is one selected from consisting of the above Chemical Formulae 11-1 to 11-5 and combinations comprising at least one of the foregoing.

In the above Chemical Formula 9-1, the ratio $k_1/(k_1+k_2+2)$ has a value of from more than about 0.5 to about 0.6 or less.

In an embodiment, the liquid crystal polymer or oligomer may include a hydroxyl group, a maleimide group, a nadimide group, a phthalimide group, an acetylene group, a propargyl ether group, a benzocyclobutene group, a cyanate group, a substituted or unsubstituted C3 to C30 alicyclic group including a double bond or a triple bond, a C8 to C30 alkenyl including a C6 to C20 aryl substituent, or a C8 to C30 alkynyl including a C6 to C20 aryl substituent, or a combination comprising at lei t one of the foregoing, at its terminus.

The alicyclic group may include a C3 to C30 cycloalkyl, a C3 to C30 cycloalkynyl, a C3 to C30 cycloalkenyl, a C3 to C30 heterocycloalkyl, a C3 to C30 heterocycloalkynyl, a C3 to C30 heterocycloalkenyl, a combination comprising at least one of the foregoing, and the like. The heterocycloalkyl, heterocycloalkynyl, and heterocycloalkenyl indicate that at least one of $CH_2$, or CH of rings of the cycloalkyl, the cycloalkynyl, and the cycloalkenyl is substituted with N, O, S, P, or a combination comprising at least one of the foregoing.

For example, the liquid crystal polymer or oligomer may include a functional group selected from the group consisting of the following Chemical Formulae 12-1 to 12-6 and combinations comprising at least one of the foregoing, at the terminus.

Chemical Formula 12-1

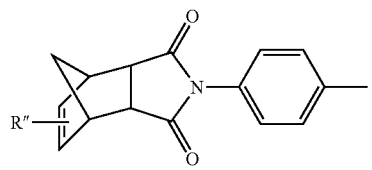

Chemical Formula 12-2

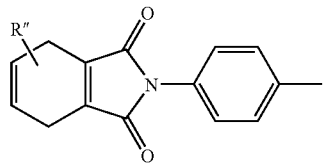

Chemical Formula 12-3

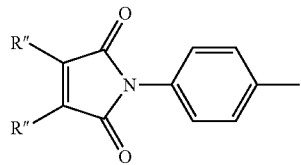

Chemical Formula 12-4

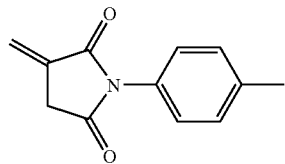

Chemical Formula 12-5

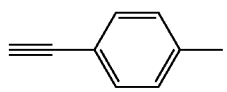

Chemical Formula 12-6

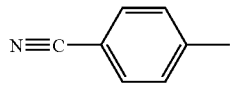

In the above Chemical Formulae 12-1 to 12-6,

R" is hydrogen, a substituted or unsubstituted C1 to C20 alkyl, a substituted or unsubstituted C6 to C30 aryl, or a combination comprising at least one of the foregoing.

A composition for forming a board may further include a maleimide-based compound including more than two maleimide groups. For example, the maleimide-based compound may be bismaleimide compound represented by the following Chemical Formula 14-1, a trismaleimide compound represented by the following Chemical Formulae 14-2 to 14-3, or a combination comprising at least one of the foregoing.

Chemical Formula 14-1

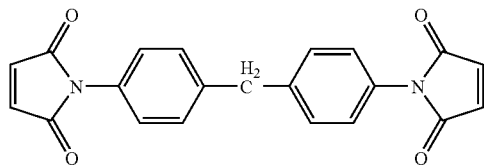

Chemical Formula 14-2

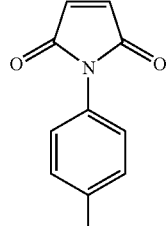

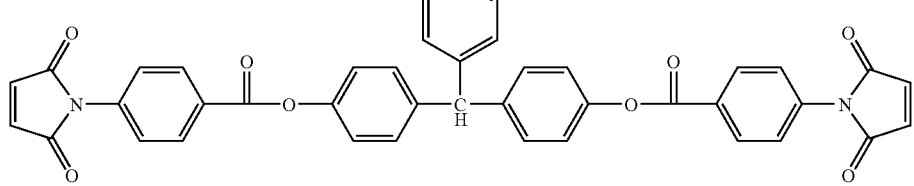

Chemical Formula 14-3

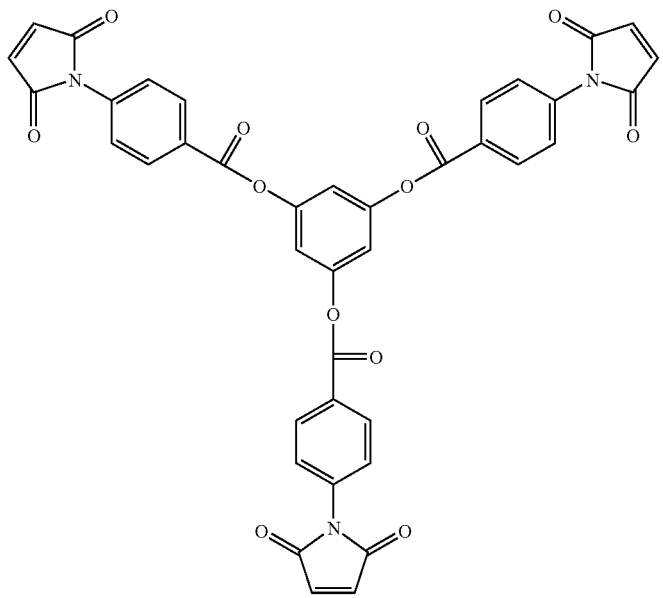

The maleimide-based compound, which is a crosslinking agent, may function as a hardener in the composition for forming a board. For example, a hydroxy group and a maleimide group of the thermally curable benzoxazine-based compound may be chemically bonded. The composition for forming a board including both maleimide-based compound and benzoxazine-based compound and a board formed from the composition may have improved mechanical and physio-chemical characteristics. For example, decreased thermal expansion coefficient may lead to an improvement in heat resistance, and increased solubility for a solvent may lead to an improvement in solubility. In an embodiment, maleimide-based compounds, where used, may be included in an amount of 0.1 to 50 percent by weight, based on the total weight of the composition for forming a board.

The composition for forming a board may further include an epoxy-based compound. Exemplary epoxy-based compounds include biphenyl novolak epoxy resin (NC-3000H, trade name; manufactured by Nippon Kayaku Co. Ltd.), Phenolic novolak epoxy resin (N-770, trade name; manufactured by Dainippon Ink & Chemicals Incorporated and Salicylaldehyde type epoxy resin (EPPN-502H, which are tradenames of products commercially available from Nippon Kayaku Co., Ltd., Japan) Therefore, the composition for forming a board may have an increased adherence to a material such as copper. In an embodiment, epoxy-based compounds where used may be included in an amount of 0.1 to 50 percent by weight, based on the total weight of the composition for forming a board.

The composition for forming a board may further include a solvent. The composition for forming a board has improved solubility in a solvent and desirably has improved stability of the viscosity. In an embodiment, the solvent may be a polar aprotic solvent. Non-limiting examples of the solvent include N,N-dimethyl acetamide, N-methylpyrrolidone (NMP), N-methylcaprolactam, N,N-dimethyl formamide, N,N-diethylformamide, N,N-diethylacetamide, N-methyl propionamide, dimethylsulfoxide, γ-butyrolactone, dimethylimidazolidinone, tetramethylphosphoric amide, ethylcellulose acetate, and the like. Such a solvent may thus be used singularly or in a combination comprising at least one of the foregoing solvents.

In an embodiment, solvents where used may be included in an amount of 1 to 90 percent by weight, based on the total weight of the composition for forming a board.

The composition for forming a board may further include various polymers such as a thermally curable resin, a thermoplastic resin, an oligomer thereof, or a combination comprising at least one of the foregoing, as long as the main characteristic of the composition for forming a board is not significantly adversely affected. For example, the composition for forming a board may further include a phosphorous compound such as phosphoric acid ester or phosphoric acid melamine; a nitrogen-included compound such as melamine or benzoguanamine; an oxazine cycle-included compound; a silicon compound; a polyimide; a polyvinylacetal; a phenoxy resin; an acryl resin; an acryl resin including a hydroxy or carboxyl group; an alkyd resin; elastomers such as a polyurethane resin, polybutadiene, a butadiene-acrylonitrile copolymer, polychloroprene, a butadiene-styrene copolymer, polyisoprene, a butyl rubber, a fluoro rubber, a natural rubber, a styrene-isoprene rubber, an acryl rubber, an epoxylated butadiene, a maleated butadiene; polyethylene; polypropylene; a polyethylene-propylene copolymer; polyvinyl chloride; polyvinylidene chloride; polystyrene; polyvinyl toluene; polyvinyl phenol; an acrylonitrile styrene resin; an styrene resin; a (meth)acrylate-butadiene-styrene((meth)acrylate-butadiene-styrene) resin; poly-4-fluoroethylene, fluoroethylene-propylene; 4-fluoroethylene-6-fluoroethylene; vinylidene fluoride; polycarbonate; polyester carbonate; polyphenylene ether; polysulfone; polyester; polyether sulfone; polyamide; polyamide imide; polyester imide; polyphenylene sulfite; (meth)acrylate; epoxy(meth)acrylate; di(meth)acryloxy-bisphenol; poly(meth)acrylate, styrene, vinylpyrrolidone, diacryl phthalate, divinylbenzene, diallylbenzene; diallyl ether bisphenol; trialkenyl isocyanurate; dicyclopentadiene; a phenolic resin; a polymerizable double bond-included monomer such as an unsaturated polyester or prepolymers thereof; a curable monomer such as polyisocyanate or prepolymers thereof, and the like. Combinations comprising at least one of the foregoing polymers may also be used. In an embodiment, the additional polymer where used may be included in an amount of 1 to 50 percent by weight, based on the total weight of the composition for forming a board.

The composition for forming a board may further include fillers, softening agents, plasticizers, antioxidants, flame retardants, flame-retardant aids, lubricants, anti-static agents, colorants, heat stabilizers, light stabilizers, UV absorbers, a combination comprising at least one of the foregoing, and the like.

The filler include organic fillers and inorganic fillers. Non-limiting examples of the organic fillers include epoxy resin powder, melamine resin powder, urea resin powder, benzoguanamine resin powder, a styrene resin, and so on. Non-limiting examples of the inorganic fillers include natural silica, fused silica, amorphous silica, hollow silica, aluminum hydroxide, boehmite, magnesium hydroxide, molybdenum oxide, zinc molybdate, zinc borate, zinc stannate, aluminum borate, potassium titanate, magnesium sulfate, silicon carbide, zinc oxide, silicon nitride, silicon dioxide, aluminum titanate, barium titanate, barium strontium titanate, aluminum oxide, alumina, clay, kaolin, talc, calcined clay, calcined kaolin, calcined talc, mica, short glass fiber, and so on. They may be used singularly or as a combination comprising at least one, and more specifically two or more, of the foregoing fillers. In an embodiment, fillers where used may be included in an amount of 1 to 90 percent by weight, based on the total weight of the composition for forming a board.

Non-limiting examples of the antioxidant include a phosphorous-based antioxidant, a phenolic antioxidant, a sulfur-based antioxidant, and the like. They are used singularly or as a combination comprising at least one, and more specifically two or more, of the foregoing antioxidants. In an embodiment, antioxidants where used may be included in an amount of 0.001 to 5 percent by weight, based on the total weight of the composition for forming a board.

Non-limiting examples of the plasticizer include polyethylene glycol, a polyamide oligomer, ethylene bis(stear) amide, ester phthalate, a polystyrene oligomer, liquid paraffin, polyethylene wax, silicone oil, and the like. They may be used singularly or as a combination comprising at least one, and more specifically two or more of the foregoing plasticizers. In an embodiment, plasticizers where used may be included in an amount of 0.001 to 5 percent by weight, based on the total weight of the composition for forming a board.

Non-limiting examples of the flame retardant include bromide polystyrene, bromide syndiotactic polystyrene, bromide polyphenylene ether, bromine-included diphenylalkane, bromine-included diphenyl ether, and so on. They may be used singularly or as a combination comprising at least one, and more specifically two or more, of the foregoing flame retardants. In an embodiment, flame retardants where used may be included in an amount of 0.1 to 30 percent by weight, based on the total weight of the composition for forming a board. In addition, the flame retardant may further include a flame-retardant aid (also referred to as an adjuvant) of antimony trioxide. In an embodiment, a portion of the flame retardant may be replaced by antimony trioxide.

Other additives not specified as to amount may where desired be included in effective amounts known in the art.

In an embodiment, the composition for forming a board may be prepared by blending the components in accordance with various combining methods, such as mixing at room temperature or melt-mixing the same.

Thus, in an embodiment, the composition for forming a board including a liquid crystal polymer or oligomer, a benzoxazine-based compound, and so on is cast on a board to provide a thin film, and then it is cured at a high temperature. The composition for forming a board may be filtered using a filter, to remove impurities included in the solution before being coated, or impregnated into a reinforcing material.

When the board is prepared from a liquid crystal polymer or oligomer and a benzoxazine-based compound, the heat resistance of the board may be improved, and the dielectric constant of the board may be reduced. In addition, since the liquid crystal polymer or oligomer and the benzoxazine-based compound have high solubility in the solvent, phase separation of these components does not occur.

According to another embodiment, provided is a prepreg obtained from the composition for forming a board. The prepreg may be fabricated by coating or impregnating a reinforcing material in the composition for forming a board and drying the same to remove the solvent. The impregnation includes dip coating, roll coating, and so on. Non-limiting examples of the reinforcing material include woven glass fiber, woven alumina glass fiber, a non-woven glass fiber fabric, a non-woven cellulose fabric, woven carbon fiber, polymer fabrics, combinations comprising at least one of the foregoing, and on the like. In addition, the reinforcing material may include a glass fiber, a silica glass fiber, a carbon fiber, an alumina fiber, a silicon carbide fiber, asbestos, rock wool, mineral wool, plaster whiskers, a woven or non-woven fabric thereof, an aromatic polyamide fiber, a polyimide fiber, a liquid crystal polyester, a polyester fiber, a fluorine fiber, a polybenzoxazole fiber, a glass fiber including a polyamide fiber, a glass fiber including a carbon fiber, a glass fiber including a polyimide fiber, a glass fiber including an aromatic polyester, a glass paper, a mica paper, an alumina paper, a craft paper, a cotton paper, a paper-glass bond paper, and the like. The reinforcing materials may be used singularly or as a combination comprising at least one, and specifically two or more reinforcing materials.

The prepreg may be bonded to a metal, such as for example copper or an alloy thereof. Specifically, the composition for forming a board is coated on a copper foil or cast on a copper foil and heated to remove the solvent, to provide a structure in which copper is bonded with the prepreg. To evaporate the solvent, the coated copper may be heated under a reduced pressure or may be ventilated. The coating may be performed by roller coating, dip coating, spray coating, spin coating, curtain coating, slit coating, screen printing, combinations of these methods, and the like.

According to another embodiment, a board with the prepreg mounted thereon is provided. For example, the board may be a flexible printed circuit ("FPC"). The board may be composed of a circuit-containing metal layer and the prepreg. In an embodiment, a metal layer is deposited on the prepreg, and is pressed and heated in a presser to melt and cure the prepreg. For example, the metal layer may include copper, aluminum, iron, stainless steel, nickel, and so on, and it may include an alloy thereof. In addition, the board may be a board in which both surfaces of the prepreg are deposited with metal layers. The board including the prepreg may be varied in many different ways. One surface or both surfaces of the board may be formed with a conductor pattern, and the conductor pattern may be formed in multiple layers, for example, 4 layers or 8 layers of a multi-layer structure.

Hereinafter, embodiments are illustrated in more detail with reference to examples. However, they are exemplary embodiments and are not limiting.

Example 1

1 g of liquid crystal oligomer represented by the following Chemical Formula 15 and 1 g of benzoxazine-based compound represented by the following Chemical Formula 16 are dissolved in 3 mL of N-methyl-2-pyrrolidone (NMP) solvent to thereby prepare a solution. Glass fiber reinforcement is impregnated with the prepared solution. Subsequently, the glass fiber impregnated with the prepared solution is applied to copper foil, and the copper foil coated with the glass fiber impregnated with the prepared solution is hardened in a high-temperature electric furnace at a temperature of about 300° C. for 1 hour. Subsequently, the copper foil is removed using aqueous nitric acid solution to provide a prepreg. The number of monomers participating in a polymer has a distribution due to the properties of fusion polymerization, and a and b may have an integer number from 1 to 50, individually.

Chemical Formula 15

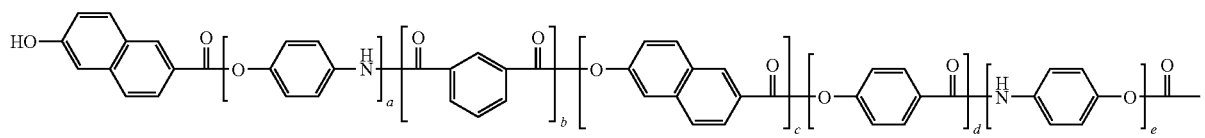

wherein, in the above formula, a, b, c, d and e are integers each independently of from 0 to 50, and a+e≧1 or b+c+d≧1. The number average molecular weight may range from about 1,000 to about 100,000.

Chemical Formula 16

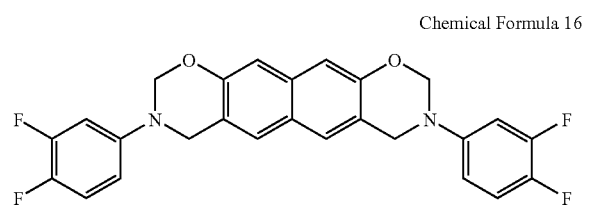

Example 2

A prepreg is prepared according to the same method as in Example 1, except that 1.4 g of liquid crystal oligomer represented by above Chemical Formula 15 and 0.6 g of benzoxazine-based compound represented by the above Chemical Formula 16 are used.

Example 3

A prepreg is prepared according to the same method as in Example 1, except that 1 g of liquid crystal oligomer represented by above Chemical Formula 15 and 0.5 g of benzoxazine-based compound represented by the above Chemical Formula 16 are used.

Comparative Example 1

A prepreg is prepared according to the same method as in Example 1, except that 1 g of liquid crystal oligomer represented by above Chemical Formula 15 and 1 g of maleimide-based compound represented by the above Chemical Formula 14-1 are used.

Comparative Example 2

A prepreg is prepared according to the same method as in Example 1, except that 1.4 g of liquid crystal oligomer represented by above Chemical Formula 15 and 0.6 g of maleimide-based compound represented by the above Chemical Formula 14-1 are used.

Thermal Curing Characteristic

Thermal analysis is performed on the benzoxazine-based compound of Example 1, a mixture of the benzoxazine-based compound and the maleimide-based compound of Example 3, and the maleimide-based compound of Comparative Example 1 by Differential Scanning Calorimetry ("DSC"). The results are presented in FIGS. 1 to 3, respectively.

Figure 2:
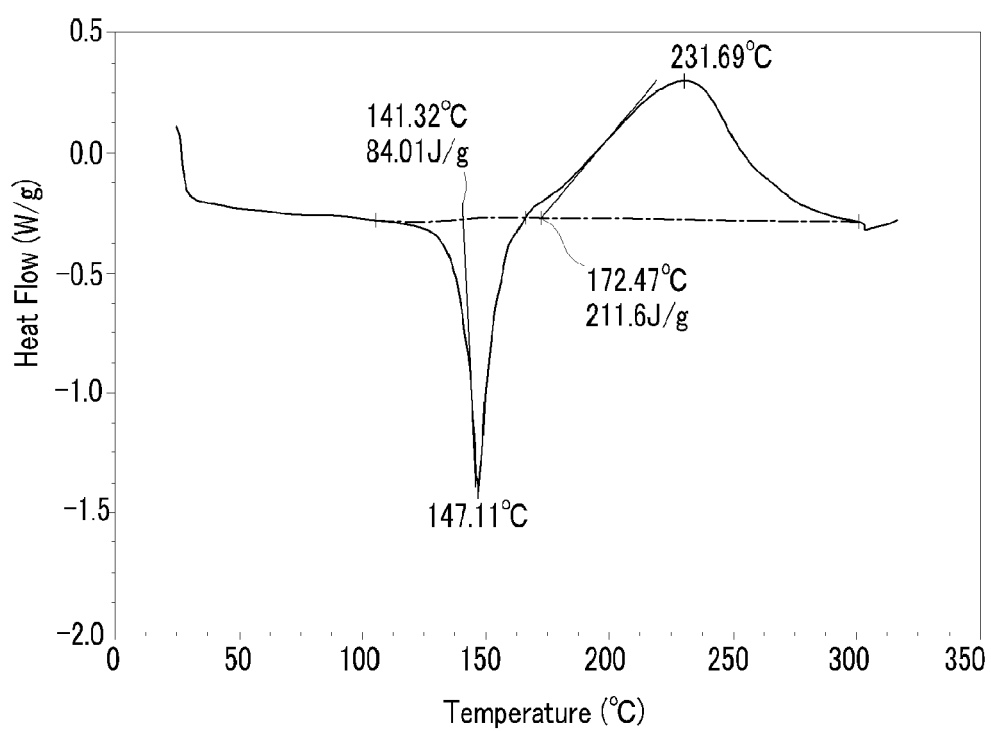
FIG. 2 is a graph showing DSC analysis of an exemplary mixture of the benzoxazine-based compound and maleimide-based compound according to Example 3.
Figure 3:
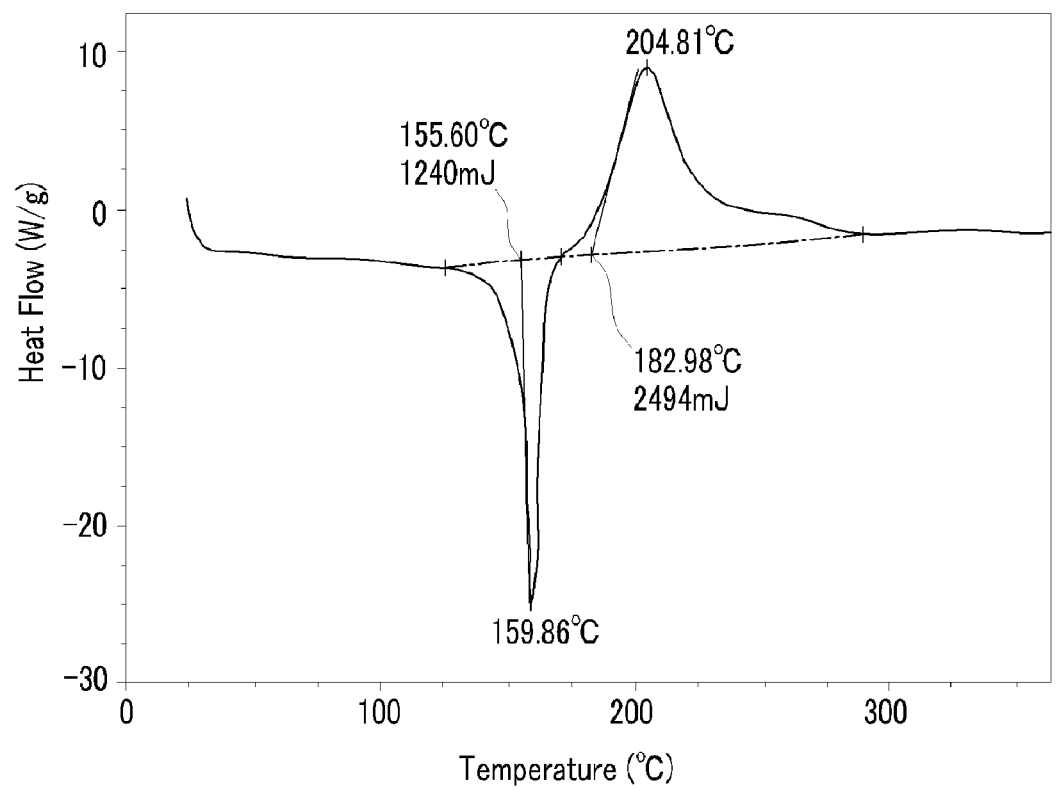
FIG. 3 is a graph showing DSC analysis of a comparative maleimide-based compound according to Comparative Example 1.

As seen in FIGS. 1 to 3, the compounds of Example 1, Example 3 and Comparative Example 1 cease being cured before the temperature reaches about 300° C., where the inflection in the curves drops to the baseline indicating that no more heat is being absorbed by the sample. Thus when the thermal curing is performed at about 300° C., the curability is high, i.e., the extent of curing is nearly quantitative based on the amount of available functional group present in the composition, as determined by the cessation of heat uptake corresponding to a cure process.

Thermal Expansion Coefficient Measurement

Thermal expansion coefficients are calculated for the prepregs prepared according to Examples 1 to 3 and Comparative Examples 1 and 2 by thermo-mechanical analysis ("TMA") at a temperature between about 50° C. and about 150° C. and the calculated thermal expansion coefficients are seen in the following Table 1. Since a sample cured at a high temperature may have a thermal history remaining (from e.g., incomplete curing, presence of residual solvent, air bubbles, etc.), temperature scanning is performed twice to thereby obtain a primary thermal expansion coefficient and a secondary thermal expansion coefficient. In Table 1, the weight ratios of Examples 1 and 2 refer to the weight ratio between liquid crystal oligomer and benzoxazine-based compound, and the weight ratio mentioned in Example 3 refers to the weight ratio between liquid crystal oligomer, benzoxazine-based compound, and maleimide-based compound. Also in Table 1, the weight ratio mentioned in Comparative Examples 1 and 2 refers to the weight ratio between liquid crystal oligomer and maleimide-based compound.

TABLE 1

| | Weight ratio | Impregnation ratio (wt %) | Thermal expansion coefficient (ppm/K, 50-150° C.) | |
|---|---|---|---|---|
| | | | First scan | Second scan |
| Example 1 | 5:5a | 60 | 12.4 | 11.8 |
| Example 2 | 7:3a | 60 | 12.0 | 14.1 |
| Example 3 | 5:2.5:2.5b | 61 | 11.7 | 13.9 |
| Comparative Example 1 | 5:5c | 60 | 16.2 | 19.1 |

TABLE 1-continued

| | Weight ratio | Impregnation ratio (wt %) | Thermal expansion coefficient (ppm/K, 50-150° C.) | |
|---|---|---|---|---|
| | | | First scan | Second scan |
| Comparative Example 2 | 7:3c | 62 | 20.0 | 19.0 |

<sup>a</sup>ratio of liquid crystal oligomer:benzoxazine-based compound.
<sup>b</sup>ratio of liquid crystal oligomer:benzoxazine-based compound:maleimide-based compound.
<sup>c</sup>ratio of liquid crystal oligomer:maleimide-based compound.

As shown in Table 1, Examples 1 to 3 each has a lower thermal expansion coefficient than that of Comparative Examples 1 and 2. This result signifies that the heat resistance of Examples 1 to 3 is superior to that of Comparative Examples 1 and 2.

Dielectric Constant

Figure 4:
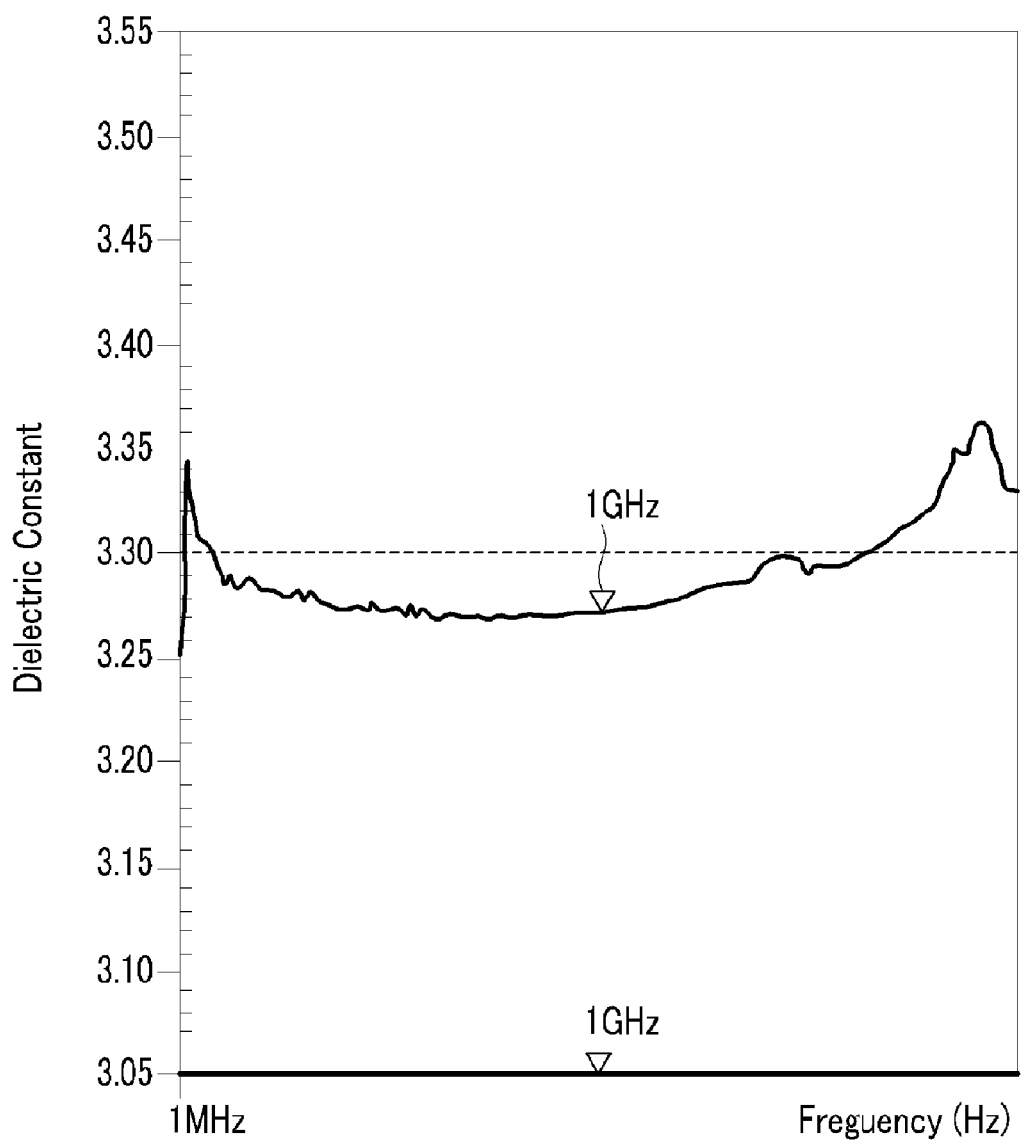
FIG. 4 is a graph showing the dielectric constant of an exemplary prepreg fabricated according to Example 1.
Figure 5:
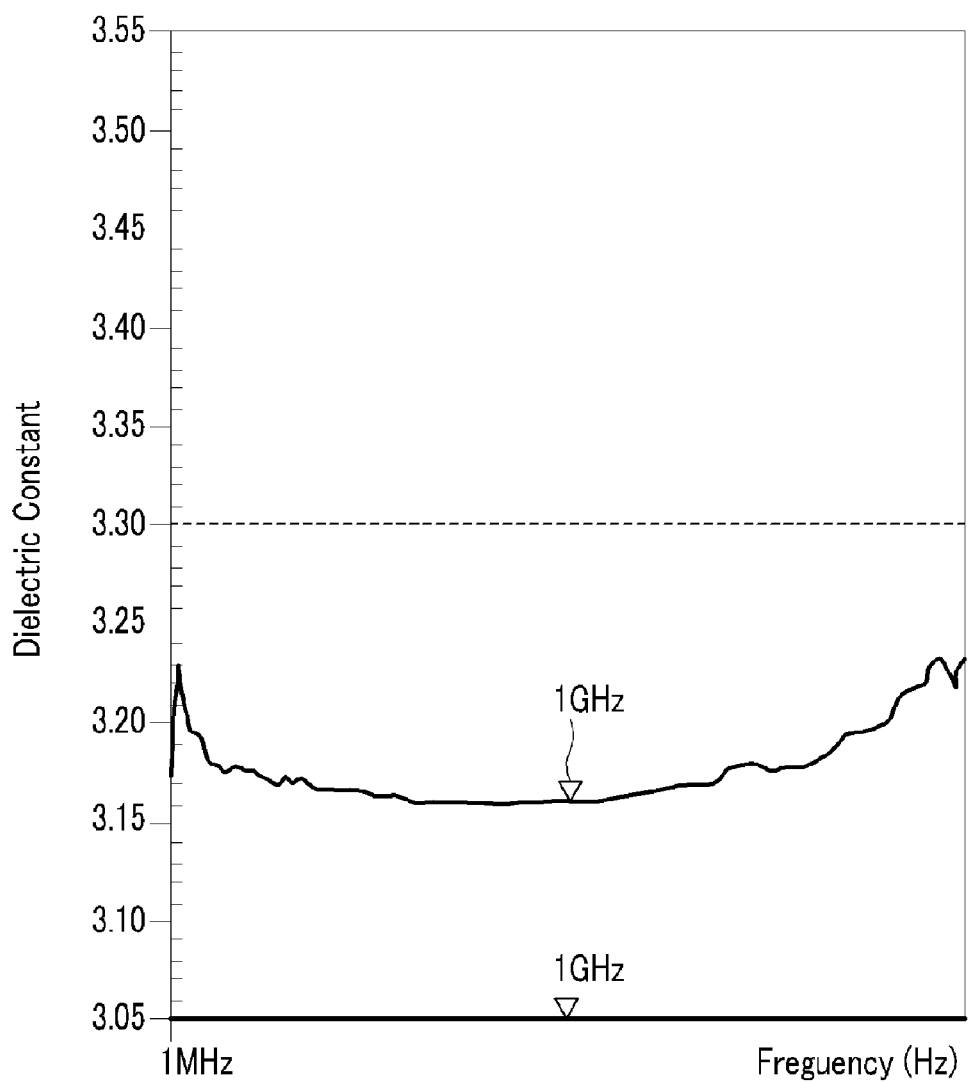
FIG. 5 is a graph showing the dielectric constant of a comparative prepreg fabricated according to Comparative Example 1.

The dielectric constants of the prepregs prepared according to Example 1 and Comparative Example 1 are measured, and the measurement results are shown in FIGS. 4 and 5. The thickness of the prepreg prepared according to Example 1 is about 290 μm, and the thickness of the prepreg prepared according to Comparative Example 1 is about 310 μm.

As shown in FIGS. 4 and 5, the dielectric constants at 1 GHz are 3.27 and 3.16, respectively. These comparable results show that the dielectric constants are desirably maintained lower than about 3.3.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A composition for forming a board comprising a benzoxazine-based compound; and
a liquid crystal polymer or oligomer,
wherein the benzoxazine-based compound comprises a compound represented by the following Chemical Formula 1:

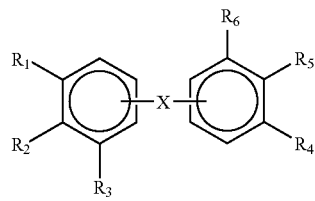

Chemical Formula 1 wherein in the above Chemical Formula 1,
X is a single bond, a C1 to C20 alkylene, a C6 to C20 arylene, a C5 to C20 heteroarylene, or a combination comprising at least one of the foregoing, or wherein X forms a fused ring with adjacent benzene ring when X is an arylene or a heteroarylene, $R_1$ and $R_2$, or $R_2$ and $R_3$ are connected to each other to form a functional group represented by the following Chemical Formula 2, and $R_4$ and $R_5$, or $R_5$ and $R_6$ are connected to each other to form a functional group represented by the following Chemical Formula 2,

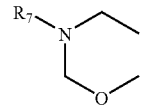

Chemical Formula 2 wherein in the above Chemical Formula 2,
$R_7$ is a substituted or unsubstituted C1 to C20 alkyl, a substituted or unsubstituted C1 to C20 alkoxy, a substituted or unsubstituted C2 to C20 alkenyl, a substituted or unsubstituted C2 to C20 alkynyl, a substituted or unsubstituted C6 to C20 aryl, a substituted or unsubstituted C6 to C20 aryloxy, a substituted or unsubstituted C7 to C20 arylalkyl, a substituted or unsubstituted C2 to C20 heteroaryl, a substituted or unsubstituted C2 to C20 heteroaryloxy, a substituted or unsubstituted C2 to C20 heteroarylalkyl, a substituted or unsubstituted C3 to C20 cycloalkyl, a substituted or unsubstituted C2 to C20 heterocycle, or a combination comprising at least one of the foregoing.

2. The composition of claim 1, wherein $R_7$ of the above Chemical Formula 2 comprises one selected from the group consisting of the following Chemical Formulae 5-1 to 5-12, and combinations comprising at least one of the foregoing:

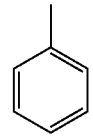

Chemical Formula 5-1

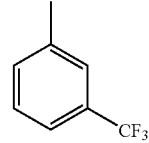

Chemical Formula 5-2

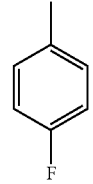

Chemical Formula 5-3

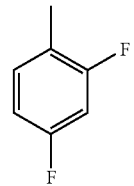

Chemical Formula 5-4

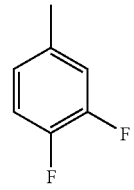

Chemical Formula 5-5

-continued

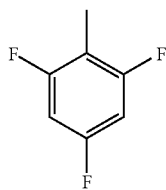
Chemical Formula 5-6

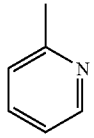
Chemical Formula 5-7

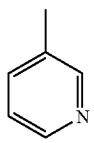
Chemical Formula 5-8

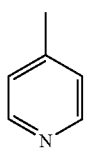
Chemical Formula 5-9

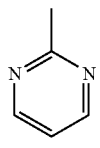
Chemical Formula 5-10

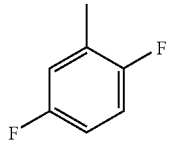
Chemical Formula 5-11

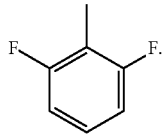
Chemical Formula 5-12

3. A composition for forming a board comprising a benzoxazine-based compound; and
a liquid crystal polymer or oligomer,
wherein the benzoxazine-based compound comprises the compound represented by the following Chemical Formula 3:

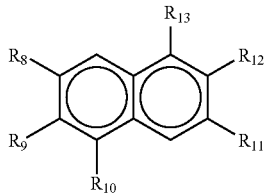
Chemical Formula 3 wherein in the above Chemical Formula 3,
$R_8$ and $R_9$, or $R_9$ and $R_{10}$ are connected to each other to form a functional group represented by the following Chemical Formula 4, and $R_{11}$ and $R_{12}$, or $R_{12}$ and $R_{13}$ are connected to each other to form a functional group represented by the following Chemical Formula 4,

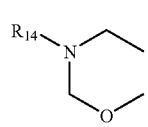
Chemical Formula 4 wherein in the above Chemical Formula 4,
$R_{14}$ is a substituted or unsubstituted C1 to C20 alkyl, a substituted or unsubstituted C1 to C20 alkoxy, a substituted or unsubstituted C2 to C20 alkenyl, a substituted or unsubstituted C2 to C20 alkynyl, a substituted or unsubstituted C6 to C20 aryl, a substituted or unsubstituted C6 to C20 aryloxy, a substituted or unsubstituted C7 to C20 arylalkyl, a substituted or unsubstituted C2 to C20 heteroaryl, a substituted or unsubstituted C2 to C20 heteroaryloxy, a substituted or unsubstituted C2 to C20 heteroarylalkyl, a substituted or unsubstituted C3 to C20 cycloalkyl, a substituted or unsubstituted C2 to C20 heterocycle, or a combination comprising at least one of the foregoing.

4. The composition of claim 3, wherein the compound represented by the above Chemical Formula 3 comprises one selected from the group consisting of compounds represented by the following Chemical Formulae 6 to 8, and combinations comprising at least one of the foregoing:

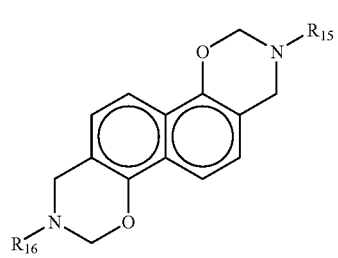
Chemical Formula 6

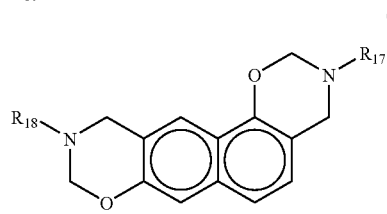
Chemical Formula 7

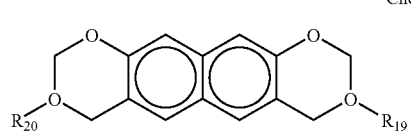
Chemical Formula 8 wherein in the above Chemical Formulae 6 to 8,
$R_{15}$ to $R_{20}$ are independently a substituted or unsubstituted C1 to C20 alkyl, a substituted or unsubstituted C1 to C20 alkoxy, a substituted or unsubstituted C2 to C20 alkenyl, a substituted or unsubstituted C2 to C20 alkynyl, a substituted or unsubstituted C6 to C20 aryl, a substituted or unsubstituted C6 to C20 aryloxy, a substituted or unsubstituted C7 to C20 arylalkyl, a substituted or unsubstituted C2 to C20 heteroaryl, a substituted or unsubstituted C2 to C20 heteroaryloxy, a substituted or unsubstituted C2 to C20 heteroarylalkyl, a substituted or unsubstituted C3 to C20 cycloalkyl, a substituted or unsubstituted C2 to C20 heterocycle, or a combination comprising at least one of the foregoing.

5. The composition of claim 4, wherein $R_{15}$ to $R_{20}$ of the above Chemical Formulae 6 to 8 are one of the groups represented by the group consisting of the following Chemical Formulae 5-1 to 5-12, and combinations comprising at least one of the foregoing:

Chemical Formula 5-1

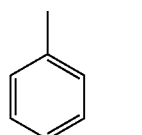

Chemical Formula 5-2

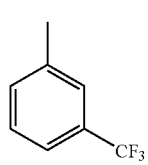

Chemical Formula 5-3

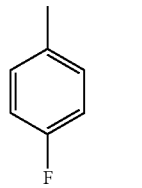

Chemical Formula 5-4

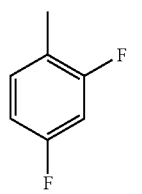

Chemical Formula 5-5

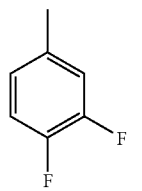

Chemical Formula 5-6

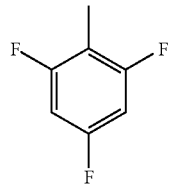

Chemical Formula 5-7

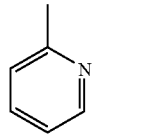

Chemical Formula 5-8

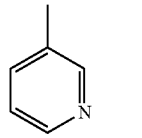

-continued

Chemical Formula 5-9

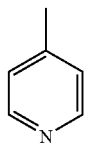

Chemical Formula 5-10

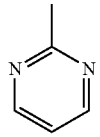

Chemical Formula 5-11

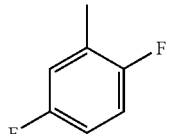

Chemical Formula 5-12

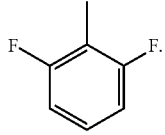

6. The composition of claim 1, wherein the liquid crystal polymer or oligomer comprises at least one of C(=O)O, O, C(=O)NR',NR', CO, or a combination comprising at least one of the foregoing where R' is hydrogen or a C1 to C5 alkyl, and a substituted or unsubstituted C6 to C30 aromatic cyclic group in its main chain.

7. The composition of claim 6, wherein the liquid crystal oligomer is represented by the following Chemical Formula 9-1:

Chemical Formula 9-1

$$B_1 \!+\! A_1 \!\overline{\phantom{x}}_{k_1} \!+\! A_2 \!\overline{\phantom{x}}_{k_2} \! B_2$$

wherein in the above Chemical Formula 9-1,
$A_1$ is represented by the following Chemical Formula 9-2, $A_2$ is represented by the following Chemical Formula 9-3, $B_1$ and $B_2$ are independently a thermally curable cross-linking reactive group including a terminal multiple bond, $k_1$ and $k_2$ are independently integers of from 1 to 50, —$Y_3$—$Ar_1$—$Y_4$—     Chemical Formula 9-2 wherein in the above Chemical Formula 9-2,
$Y_3$ and $Y_4$ are independently C(=O)O, O, C(=O)NR, NR, CO, or a combination comprising at least one of the foregoing where R is hydrogen, a C1 to C20 alkyl, or a C6 to C30 aryl; and $Ar_1$ includes at least one selected from the group consisting of the following Chemical Formulae 10-1 to 10-5, —$Y_5$—$Ar_2$—$Y_6$—     Chemical Formula 9-3 wherein in the above Chemical Formula 9-3,
$Y_5$ and $Y_6$ are independently C(=O)O, O, C(=O)NR, NR, CO, or a combination comprising at least one of the foregoing where R is hydrogen, a C1 to C20 alkyl, or a C6 to C30 aryl; and $Ar_2$ includes at least one selected from the group consisting of the following Chemical Formulae 11-1 to 11-5,

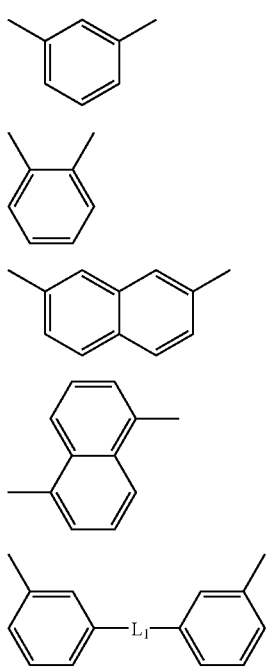

Chemical Formula 10-1

Chemical Formula 10-2

Chemical Formula 10-3

Chemical Formula 10-4

Chemical Formula 10-5 wherein in the above Chemical Formula 10-5, $L_1$ is a divalent organic functional group,

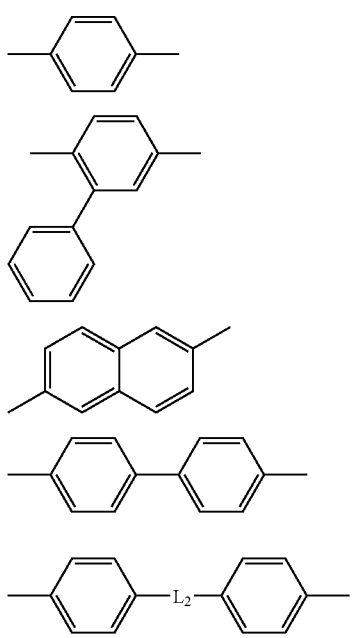

Chemical Formula 11-1

Chemical Formula 11-2

Chemical Formula 11-3

Chemical Formula 11-4

Chemical Formula 11-5 wherein in the above Chemical Formula 11-5, $L_2$ is a divalent organic functional group.

8. The composition of claim 7, wherein in the above Chemical Formula 9-1, the ratio of $k_1/(k_1+k_2+2)$ has a value of more than about 0.5 to about 0.6 or less.

9. The composition of claim 7, wherein the liquid crystal oligomer has a number average molecular weight of from about 500 to about 10,000.

10. A composition for forming a board comprising a benzoxazine-based compound; and
a liquid crystal polymer or oligomer,
wherein the liquid crystal polymer or oligomer comprises a hydroxyl group, a maleimide group, a nadimide group, a phthalimide group, an acetylene group, a propargyl ether group, a benzocyclobutene group, a cyanate group, a substituted or unsubstituted C3 to C30 alicyclic group including a double bond or a triple bond, a C8 to C30 alkenyl including a C6 to C20 aryl substituent, or a C8 to C30 alkynyl including a C6 to C20 aryl substituent, or a combination comprising at least one of the foregoing, at its terminus.

11. The composition of claim 10, wherein the liquid crystal polymer or oligomer comprises a functional group selected from consisting of the following Chemical Formulae 12-1 to 12-6 and combinations comprising at least one of the foregoing at the terminus:

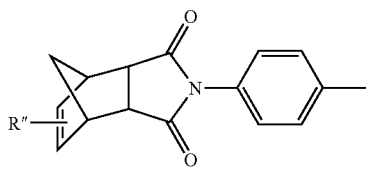

Chemical Formula 12-1

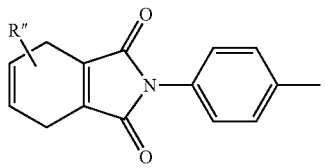

Chemical Formula 12-2

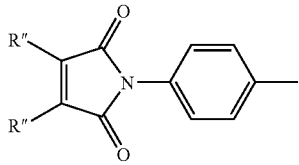

Chemical Formula 12-3

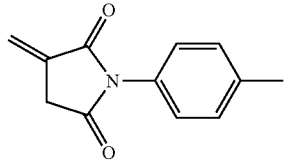

Chemical Formula 12-4

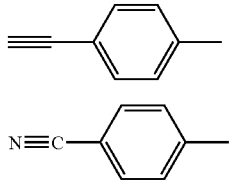

Chemical Formula 12-5

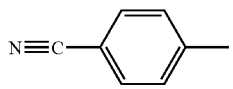

Chemical Formula 12-6 wherein in the above Chemical Formulae 12-1 to 12-6, and R″ is hydrogen, a substituted or unsubstituted C1 to C20 alkyl, a substituted or unsubstituted C6 to C30 aryl, or a combination comprising at least one of the foregoing.

12. The composition of claim 1, wherein the weight ratio of a liquid crystal polymer or oligomer and the benzoxazine-based compound is from about 1:9 to about 9:1.

13. The composition of claim 1, wherein the composition further comprises a maleimide-based compound including at least two maleimide groups.

14. The composition of claim 1, wherein the composition further comprises an epoxy-based compound.

15. The composition of claim 1, wherein the composition further comprises an aprotic solvent.

16. A prepreg fabricated from the composition for forming a board according to claim 1.

17. A board comprising a prepreg fabricated from the composition for forming a board according to claim 1.

18. The board of claim 17, wherein the board further comprises a metal layer disposed on one surface or both surfaces of the prepreg.

* * * * *